US012588968B2

(12) United States Patent
Suzuki

(10) Patent No.: US 12,588,968 B2
(45) Date of Patent: Mar. 31, 2026

(54) DENTAL HANDPEICE

(71) Applicant: Kazuyoshi Suzuki, Chiba (JP)

(72) Inventor: Kazuyoshi Suzuki, Chiba (JP)

( * ) Notice: Subject to any disclaimer, the term of this patent is extended or adjusted under 35 U.S.C. 154(b) by 111 days.

(21) Appl. No.: 18/833,716

(22) PCT Filed: Sep. 20, 2023

(86) PCT No.: PCT/JP2023/034107
§ 371 (c)(1),
(2) Date: Jul. 26, 2024

(87) PCT Pub. No.: WO2024/176500
PCT Pub. Date: Aug. 29, 2024

(65) Prior Publication Data
US 2025/0359960 A1      Nov. 27, 2025

(30) Foreign Application Priority Data
Feb. 22, 2023      (JP) ................................. 2023-039100

(51) Int. Cl.
*A61C 1/05*      (2006.01)
(52) U.S. Cl.
CPC .................................... *A61C 1/052* (2013.01)
(58) Field of Classification Search
CPC ............. Y10S 415/904; F16C 2316/13; A61B 17/1624; A61B 17/1622; A61C 1/05; A61C 1/052; A61C 1/057; A61C 1/14; A61C 17/0202
USPC ....................................................... 433/132
See application file for complete search history.

(56) References Cited

U.S. PATENT DOCUMENTS

| 4,146,964 | A | * | 4/1979 | Lares | ........................ | A61C 1/05 |
| | | | | | | 433/132 |
| 4,198,754 | A | * | 4/1980 | Lares | ..................... | A61C 1/181 |
| | | | | | | 433/132 |
| 4,470,813 | A | * | 9/1984 | Thorburn | .................. | A61C 1/05 |
| | | | | | | 416/200 R |
| 4,505,677 | A | * | 3/1985 | Nakayama | ............... | A61C 1/05 |
| | | | | | | 433/132 |
| 5,447,135 | A | * | 9/1995 | Norkus | ................... | F02D 11/06 |
| | | | | | | 123/401 |
| 5,507,642 | A | * | 4/1996 | Wohlgemuth | ......... | A61C 1/057 |
| | | | | | | 433/132 |

(Continued)

FOREIGN PATENT DOCUMENTS

| CN | 109009495 | A | * | 12/2018 | ............. | A61C 1/052 |
| CN | 109172008 | A | * | 1/2019 | ............... | A61C 1/05 |

(Continued)

*Primary Examiner* — Matthew M Nelson
(74) *Attorney, Agent, or Firm* — Carrier, Shende & Associates P.C.; Fulchand P. Shende; Joseph P. Carrier

(57)      ABSTRACT

Provided is an air turbine type dental handpiece capable of reducing a generated sound volume. An air turbine 2 is rotationally driven by compressed air that is supplied to the internal space of a housing 11, and the treatment such as cutting of the tooth of a patient is performed by a cutting tool 4. A blade 22 is a toroidal type blade (a blade having a shape in which a first blade portion 221 and a second blade portion 222 are continuous with each other at a bridge portion 224). Therefore, the generation of a large eddy current around the air turbine 2 is suppressed, and the generated sound volume is reduced.

4 Claims, 2 Drawing Sheets

(56)                 References Cited

U.S. PATENT DOCUMENTS

| | | | | | |
|---|---|---|---|---|---|
| 6,120,291 | A | * | 9/2000 | Bareth | A61C 1/05 |
| | | | | | 433/132 |
| 6,152,736 | A | * | 11/2000 | Schmidinger | A61C 1/05 |
| | | | | | 433/132 |
| 6,270,345 | B1 | * | 8/2001 | Abbott | A61C 1/05 |
| | | | | | 433/132 |
| 8,961,103 | B1 | * | 2/2015 | Wolff | F03D 3/02 |
| | | | | | 415/4.4 |
| 9,072,569 | B2 | * | 7/2015 | Roesch | A61C 1/057 |
| 2001/0002975 | A1 | * | 6/2001 | Hashimoto | A61C 1/05 |
| | | | | | 433/132 |
| 2005/0112526 | A1 | * | 5/2005 | Kuo | A61C 1/057 |
| | | | | | 433/132 |
| 2007/0259312 | A1 | * | 11/2007 | Wang | A61C 1/05 |
| | | | | | 433/132 |
| 2011/0117517 | A1 | * | 5/2011 | Bergheim | A61C 5/40 |
| | | | | | 433/81 |
| 2014/0212271 | A1 | * | 7/2014 | Lai | F01D 5/02 |
| | | | | | 415/116 |

| | | | | | |
|---|---|---|---|---|---|
| 2015/0132713 | A1 | * | 5/2015 | Gates | A61C 1/145 |
| | | | | | 433/91 |
| 2021/0386510 | A1 | * | 12/2021 | Li | A61C 1/05 |
| 2022/0008162 | A1 | * | 1/2022 | Goisser | A61C 1/05 |
| 2023/0149137 | A1 | * | 5/2023 | Badia Farré | A61C 1/00 |
| | | | | | 433/29 |
| 2025/0099123 | A1 | * | 3/2025 | Glöggler | A61B 17/22012 |
| 2025/0359960 | A1 | * | 11/2025 | Suzuki | A61C 1/052 |

FOREIGN PATENT DOCUMENTS

| | | | | | | |
|---|---|---|---|---|---|---|
| CN | 114711995 | A | * | 7/2022 | | A61C 1/05 |
| DE | 10320903 | B4 | * | 9/2010 | | A61C 1/057 |
| DE | 102010015614 | A1 | * | 10/2011 | | A61C 1/05 |
| EP | 2752167 | A1 | * | 7/2014 | | A61C 1/05 |
| FR | 2692621 | A1 | * | 12/1993 | | F01D 15/067 |
| JP | 2000042000 | A | * | 2/2000 | | |
| JP | 2001-162416 | A | | 6/2001 | | |
| JP | 2014-239990 | A | | 12/2014 | | |
| JP | 2017018460 | A | * | 1/2017 | | |
| JP | 2020116371 | A | * | 8/2020 | | |
| WO | WO-2009029725 | A1 | * | 3/2009 | | A61C 1/16 |
| WO | WO-2024176500 | A1 | * | 8/2024 | | A61C 1/05 |

* cited by examiner

DENTAL HANDPEICE

TECHNICAL FIELD

The present invention relates to an air turbine type dental handpiece.

BACKGROUND ART

According to an air turbine type dental handpiece, an impeller provided inside an air turbine is rotated at a high speed by compressed air that is supplied from a compressor, and a dental caries is cut and/or removed by a cutting tool coaxially attached to the impeller. In general, the air turbine type dental handpiece includes a housing, an air turbine that is built in the housing and that is provided with a cutting tool for cutting a tooth, and a handle-side housing that is attached to the housing and that is provided with an air supply passage, an exhaust passage, and the like for the air turbine. There is a case where a water supply passage and/or a spray air passage is further provided inside the handle-side housing. There is also a case where a configuration is made such that the exhaust passage is connected to or merged with the water supply passage.

The compressed air from the compressor is supplied to the air supply passage via an air supply circuit including an air supply amount adjusting mechanism configured by a pedal or the like of a chair unit, and an air supply tube or an air supply pipe that connects the air supply circuit and the air supply passage provided inside the handle-side housing.

SUMMARY OF INVENTION

Technical Problem

However, according to the dental handpiece having the above configuration, since the impeller inside the air turbine is rotated at a high speed by the compressed air from the compressor, a "keen" sound is generated from the air turbine, which is often annoying to a dentist and a patient. Even though it is desired that a patient feels a sense of security in dental treatment, there is a case where the patient is made to feel fear.

Therefore, an object of the present invention is to provide an air turbine type dental handpiece capable of reducing a generated sound volume.

Solution to Problem

A dental handpiece according to the present invention includes:

a housing;

an air turbine that is built in the housing and that is for rotating a cutting tool for cutting a tooth;

a handle-side housing that is attached to the housing and that is provided with an air supply passage and an exhaust passage for the air turbine, in which a blade of the air turbine is configured with a toroidal type blades, the air supply passage is connected to the housing such that compressed air is introduced above the blade of the air turbine inside the housing, and the exhaust passage is connected to the housing such that the compressed air is led out from below the blade of the air turbine inside the housing.

According to the dental handpiece having the above configuration, the air turbine is rotationally driven by the compressed air that is supplied from a compressor by the operation of an operator in the internal space of the housing, and the treatment such as cutting of the tooth of a patient is performed by the cutting tool coaxially attached to a shaft of the air turbine. Since the blade is a toroidal type blade (a blade having a shape in which two blades are continuous with each other at a bridge portion), the generation of a large eddy current around the air turbine is suppressed, and a reduction in the generated sound volume is achieved. The generation of a so-called blade tip vortex, which is one of the causes of a decrease in the rotation efficiency of the air turbine and eventually the cutting tool, can be suppressed.

In the dental handpiece having the above configuration, it is preferable that the blade is provided to be detachably attached to the air turbine.

According to the dental handpiece having the above configuration, since it is possible to selectively use a plurality of types of blades, the convenience or usability of the dental handpiece is improved.

In the dental handpiece having the above configuration, it is preferable that the cutting tool is coaxially provided to be detachably attached to a shaft of the air turbine.

According to the dental handpiece having the above configuration, since it is possible to selectively use a plurality of types of cutting tools, the convenience or usability of the dental handpiece is improved.

In the dental handpiece having the above configuration, it is preferable that the blade is made of at least one of an aluminum alloy, ceramics, and heavy metal.

DESCRIPTION OF EMBODIMENTS

Figure 1:
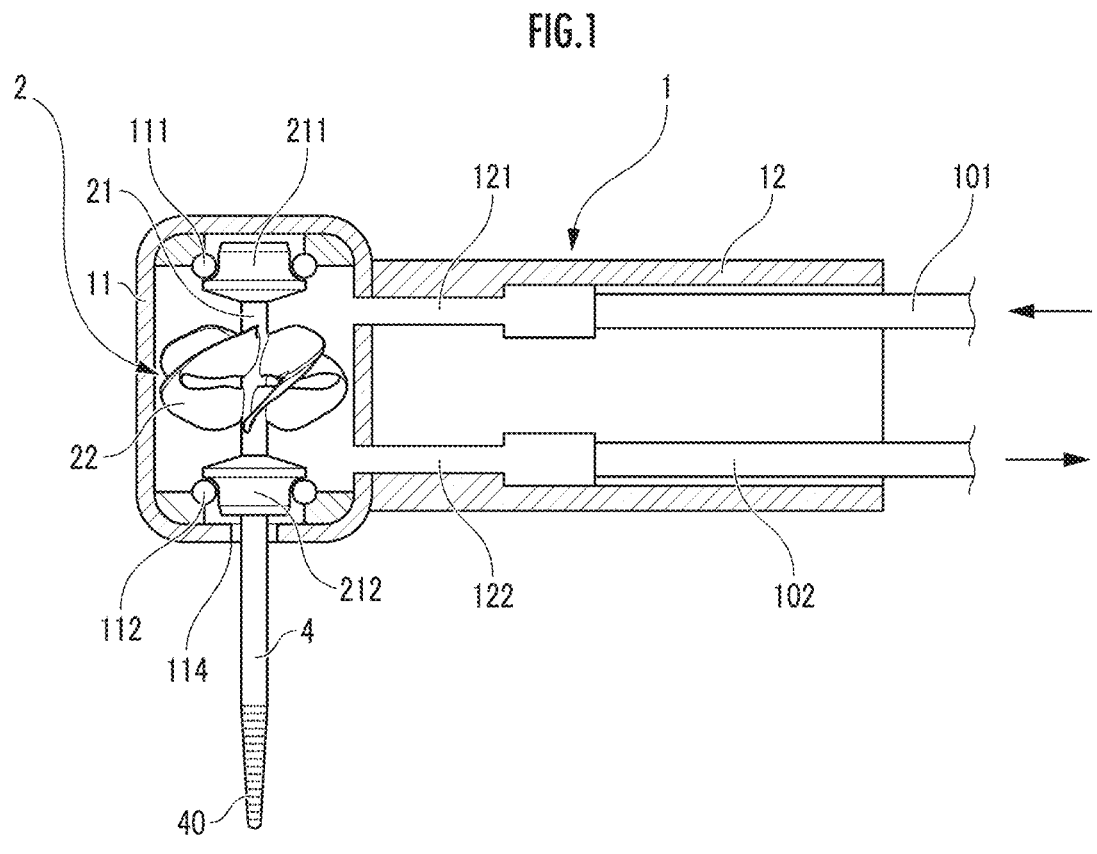
FIG. 1 is an explanatory diagram of the configuration of a dental handpiece as an embodiment of the present invention.

An air turbine type dental handpiece 1 as an embodiment of the present invention illustrated in FIG. 1 includes a housing 11 having a substantially cylindrical internal space, an air turbine 2 that is built in the housing 11 and that rotates a cutting tool 4 for cutting a tooth, and a handle-side housing 12 that is attached to the housing 11 and that is provided with an air supply passage 121 and an exhaust passage 122 for the air turbine 2. The handle-side housing 12 is designed to have a suitable outer shape and size from the viewpoint of being gripped by an operator such as a dentist. As illustrated in FIG. 1, an air supply pipe 101 is connected to the air supply passage 121, and an exhaust pipe 102 is connected to the exhaust passage 122.

An upper portion of the housing 11 may be configured with a lid member, and the lid member may be opened or removed to allow access to the internal space of the housing 11 and to be capable of replacing the air turbine 2 (or a shaft sheath 210 and a blade 22 formed integrally with the shaft sheath 210).

Figure 2:
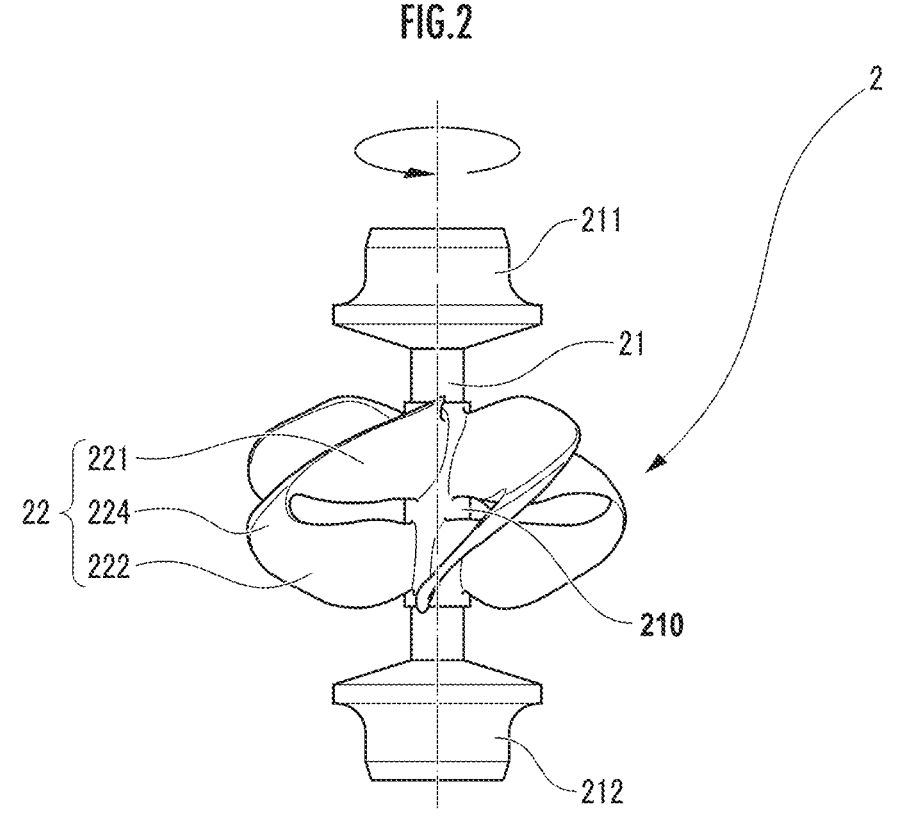
FIG. 2 is an explanatory diagram of the configuration of a toroidal type blade according to the embodiment of the present invention.

As illustrated in FIGS. 1 and 2, the air turbine 2 includes a substantially cylindrical shaft 21, and N pieces (for example, N=4, N may be 2, 3, or 5 or more) of blades 22 that extend to protrude in a radial direction from the shaft 21. The N pieces of blades 22 are disposed to have N-fold rotational symmetry about the central axis of the shaft 21. The shaft 21 is provided with the shaft sheath 210 formed integrally with the N pieces of blades 22. The shaft sheath 210 is formed in a substantially cylindrical shape, and is fixed to the shaft 21 with an inner peripheral surface thereof being in pressure contact with an outer peripheral surface of the shaft 21 over the entire circumference. In a case where the shaft 21 and the N pieces of blades 22 are integrally molded, or in a case where the shaft 21 and the N pieces of blades 22 are fixed to each other, the shaft sheath 210 may be omitted.

As illustrated in FIG. 1, the shaft 21 is held to be rotatable with respect to the housing 11 through each of an upper ball bearing 111 and a lower ball bearing 112 at each of a shaft upper portion 211 and a shaft lower portion 212. The cutting tool 4 is fixed to the shaft lower portion 212 coaxially with the shaft 21. The cutting tool 4 may be detachably attached to the shaft lower portion 212 by fitting an upper portion of the cutting tool 4 into a hole of a lower portion of the shaft lower portion 212. As illustrated in FIG. 1, in the cutting tool 4, at least a portion that includes a file portion 40 protrudes toward a lower side of the housing 11 through a through-hole 114 provided in a lower portion of the housing 11.

As illustrated in FIG. 2, the blade 22 includes a first blade portion 221, a second blade portion 222, and a bridge portion 224. The first blade portion 221 protrudes in the radial direction and obliquely downward from the shaft sheath 210, and is then bent in a clockwise direction as viewed from above to extend in a substantially L shape. The second blade portion 222 protrudes in the radial direction and obliquely upward from the shaft 21, and is then bent in a counter-clockwise direction as viewed from above to extend in a substantially L shape. The bridge portion 224 is a portion at which the distal end portion of the first blade portion 221 (a portion bent in a clockwise direction) and the distal end portion of the second blade portion 222 (a portion bent in a counterclockwise direction) are continuous with each other.

The second blade portion 222 includes, for example, a central axis of the shaft sheath 210, and has a shape in which a mirror image of the first blade portion 221 is reversed upside down with respect to a plane perpendicular to the protruding direction of the first blade portion 221 from the shaft sheath 210. The relative position in an axial direction, the relative position in a circumferential direction (phase difference), and the relative posture of a continuous location or region of each of the first blade portion 221 and the second blade portion 222 with respect to the shaft sheath 210 are adjusted such that the first blade portion 221 and the second blade portion 222 are continuous with each other at the distal end portions thereof through the bridge portion 224. The blade 22 may be configured such that the first blade portion 221 and the second blade portion 222 are continuous such that a part of the distal end portion of the first blade portion 221 and a part of the distal end portion of the second blade portion 222 overlap or are common to each other. In this case, the bridge portion 224 is configured with the overlap portion.

The blade 22 may be formed in a substantially semicircular shape to include a twisted portion of a Moebius ring in an intermediate portion. In this case, the first blade portion 221 and the second blade portion 222 are configured with half of the substantially semicircular portion (substantially quarter ring-shaped portion), and the bridge portion 224 is configured with the twisted portion.

The blade 22 may be made of various light metals such as aluminum (specific gravity: 2.7) or an aluminum alloy (specific gravity: 2.6 to 2.8) such as duralumin (specific gravity: 2.8). The blade 22 may be made of a metal composite material such as cermet (TiC·TiN) (specific gravity: 6.0), in addition to ceramics such as forsterite ($2MgO·SiO_2$) (specific gravity: 3.0), silicon carbide (SiC) (specific gravity: 3.16), silicon nitride ($Si_3N_4$) (specific gravity: 3.3), aluminum nitride (AlN) (specific gravity: 3.4), alumina ($Al_2O_3$) (specific gravity: 3.8), yttria ($Y_2O_3$) (specific gravity: 4.9), or zirconia ($ZrO_2$) (specific gravity: 6.0). The blade 22 may be made of heavy metal such as iron (specific gravity: 7.9), nickel (specific gravity: 8.8), copper (specific gravity: 8.9), or an alloy of these. In a case where the blade 22 is made of chromium or lead, it is preferable that the blade 22 is completely plated with harmless metal such as silver or nickel. The blade 22 having a complicated shape can be produced by a three-dimensional printer using raw material powder and/or laser processing or the like of raw materials.

The blade 22 may be configured such that the specific gravity of each of the first blade portion 221, the second blade portion 222, and the bridge portion 224 is larger than the specific gravity of the shaft sheath 210. The blade 22 may be configured such that the specific gravity of the bridge portion 224 is larger than the specific gravity of each of the shaft sheath 210, the first blade portion 221, and the second blade portion 222. For example, the blade 22 may be made of a base material such as light metal or ceramics, and a thermal spraying film of ceramics having higher specific gravity than the base material may be formed on a part of the blade 22, whereby the blade 22 having different specific gravity depending on a location can be produced. In addition, the blade 22 may be made of a base material such as heavy metal or ceramics, and a thermal spraying of ceramics having lower specific gravity than the base material may be formed on a part of the blade 22, whereby the blade 22 having different specific gravity depending on a location can be produced.

Operation and Effects

According to the dental handpiece 1 having the above configuration, the compressed air is supplied from the compressor to the internal space of the housing 11 through the air supply pipe 101 and the air supply passage 121 by the operation of the operator. In an air supply circuit communicating with the compressor, the supply amount of the compressed air is adjusted by an air supply amount adjusting mechanism configured with a pedal or the like of a chair unit. The air turbine 2 is rotationally driven by the compressed air in the internal space of the housing 11, and the treatment such as cutting of the tooth of a patient is performed by the cutting tool 4 coaxially attached to the shaft 21 of the air turbine 2. The compressed air is discharged from the internal space of the housing 11 to the outside of the dental handpiece 1 through the exhaust passage 122 and the exhaust pipe 102.

The blade 22 is a toroidal type blade (a blade having a shape in which the first blade portion 221 and the second blade portion 222 are continuous with each other at the bridge portion 224 (refer to FIG. 2)). Therefore, the generation of a large eddy current around the air turbine 2 is suppressed, and the generated sound volume is reduced. The generation of a so-called blade tip vortex, which is one of the causes of a decrease in the rotation efficiency of the air turbine 2 and eventually the cutting tool 4, can be suppressed.

Other Embodiments of Present Invention

Figure 3:
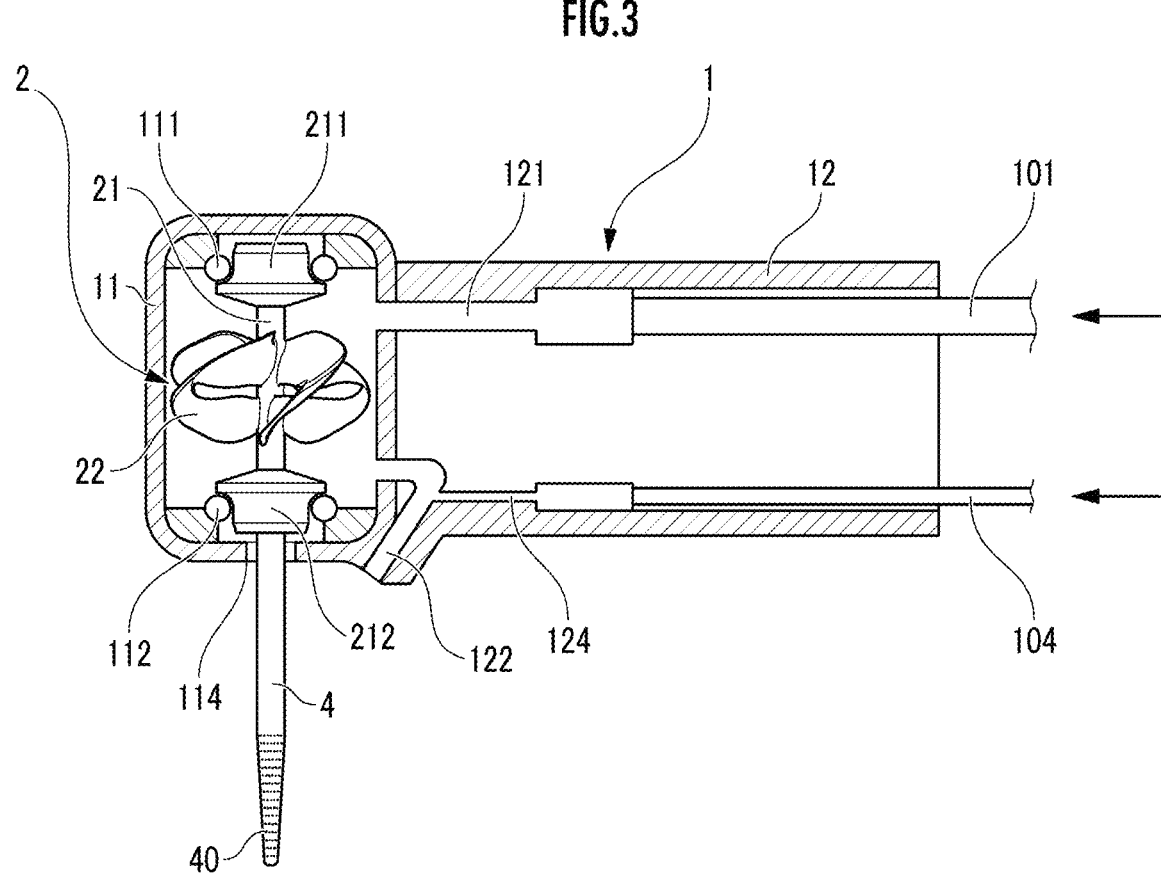
FIG. 3 is an explanatory diagram of the configuration of a dental handpiece as another embodiment of the present invention.

The dental handpiece 1 as another embodiment of the present invention illustrated in FIG. 3 has the same configuration as the dental handpiece 1 (refer to FIG. 1) of the embodiment described above, except for the configuration of the handle-side housing 12. Therefore, the same configurations are denoted by the same reference numerals, and the description thereof will be omitted.

As illustrated in FIG. 3, the handle-side housing 12 is provided with a water supply passage 124 that communicates with an external space of the handle-side housing 12 and that is open toward the lower side of the housing 11, in addition to the air supply passage 121 and the exhaust passage 122 for the air turbine 2. As illustrated in FIG. 3, a water supply pipe 104 is connected to the water supply passage 124, and the exhaust passage 122 is provided to join the water supply passage 124.

According to the dental handpiece 1 having the above configuration, the compressed air is supplied from the compressor to the internal space of the housing 11 through the air supply pipe 101 and the air supply passage 121 by the operation of the operator. In the air supply circuit communicating with the compressor, the supply amount of the compressed air is adjusted by the air supply amount adjusting mechanism configured with a pedal or the like of the chair unit. The air turbine 2 is rotationally driven by the compressed air in the internal space, and the treatment such as cutting of the tooth of a patient is performed by the cutting tool 4 coaxially attached to the shaft 21 of the air turbine 2. The compressed air is discharged from the internal space of the housing 11 to the outside of the dental handpiece 1 through the exhaust passage 122 and the exhaust pipe 102. Water is supplied from a water source to the water supply passage 124 through the water supply pipe 104, and the water is atomized by a shearing force of the compressed air that flows from the exhaust passage 122 to the water supply passage 124, and the atomized water is jetted toward the lower side of the housing 11 to wash the affected part around the cutting tool 4.

Since the blade 22 is a toroidal type blade (a blade having a shape in which the first blade portion 221 and the second blade portion 222 are continuous with each other at the bridge portion 224 (refer to FIG. 2)), the generation of a large eddy current around the air turbine 2 is suppressed, and the generated sound volume is reduced. The generation of a so-called blade tip vortex, which is one of the causes of a decrease in the rotation efficiency of the air turbine 2 and eventually the cutting tool 4, can be suppressed.

INDUSTRIAL AVAILABILITY

According to the dental handpiece of the present invention, the sound volume that is generated by the high-speed rotation of the air turbine by the compressed air is reduced, so that the anxiety felt by a patient due to the generated sound is reduced and the dentist can also have more skillful and psychological leeway, which contributes to the development of the industry.

DESCRIPTION OF REFERENCE NUMERALS

1 . . . dental handpiece
101 . . . air supply pipe
102 . . . exhaust pipe
104 . . . water supply pipe
11 . . . housing
111 . . . upper ball bearing
112 . . . lower ball bearing
114 . . . through-hole
12 . . . handle-side housing
121 . . . air supply passage
122 . . . exhaust passage
124 . . . water supply passage
2 . . . air turbine
21 . . . shaft,
210 . . . shaft sheath
211 . . . shaft upper portion
212 . . . shaft lower portion
22 . . . blade
221 . . . first blade portion
222 . . . second blade portion
224 . . . bridge portion
4 . . . cutting tool
40 . . . file portion

The invention claimed is:

1. A dental handpiece comprising:
a housing;
an air turbine built in the housing and configured to rotate a cutting tool for cutting a tooth;
a handle-side housing attached to the housing and provided with an air supply passage and an exhaust passage for the air turbine,
wherein a blade of the air turbine is configured by toroidal blades,
the air supply passage is connected to the housing such that compressed air is introduced above the blade of the air turbine inside the housing, and
the exhaust passage is connected to the housing such that the compressed air is led out from below the blade of the air turbine inside the housing.

2. The dental handpiece according to claim 1, wherein the blade is provided to be detachably attached to a shaft of the air turbine.

3. The dental handpiece according to claim 1, wherein the cutting tool is coaxially provided to be detachably attached to a shaft of the air turbine.

4. The dental handpiece according to claim 1, wherein the blade is made of at least one of an aluminum alloy, ceramics, and heavy metal.

\* \* \* \* \*